Oct. 27, 1953
G. W. KEITT ET AL
2,657,170
ANTIMYCIN AND PROCESS FOR PRODUCTION
Filed Feb. 2, 1949
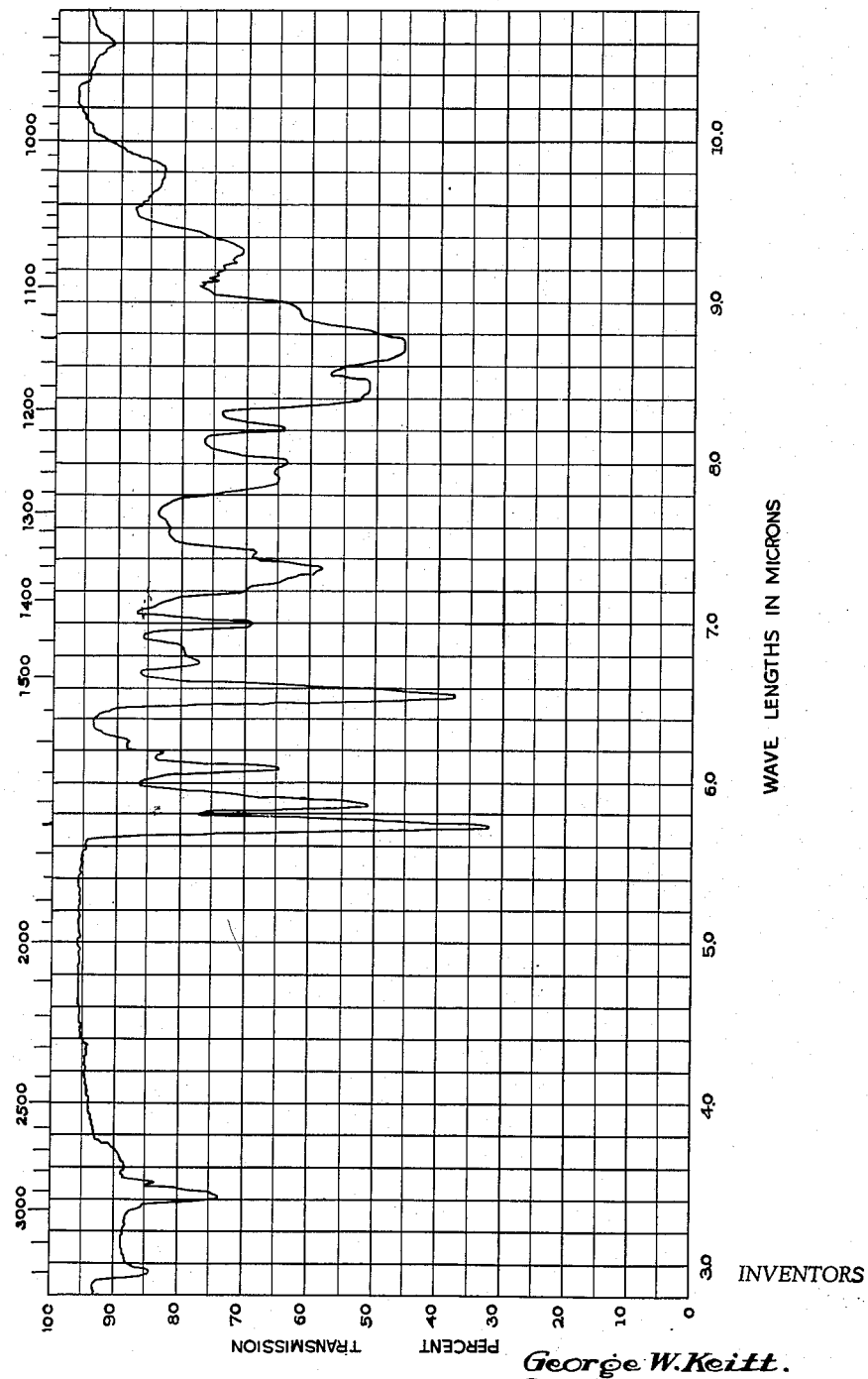
INVENTORS
George W. Keitt.
Curt Leben.
Frank M. Strong.
BY
Adams, Forward & McLean ATTORNEYS Patented Oct. 27, 1953

2,657,170

UNITED STATES PATENT OFFICE 2,657,170

ANTIMYCIN AND PROCESS FOR PRODUCTION

George W. Keitt, Curt Leben, and Frank M. Strong, Madison, Wis., assignors to Wisconsin Alumni Research Foundation, Madison, Wis., a corporation of Wisconsin Application February 2, 1949, Serial No. 74,244

8 Claims. (Cl. 167—65)

The present invention relates to biochemical compositions, and more particularly to a new antibiotic and the process of preparing the same.

It has been known for some time that antibiotic substances may be produced by growing certain species or strains of microorganisms in various types of nutrient mediums. Well known examples are the formation of the penicillins by the cultivation or fermentation of *Penicillium notatum*, the formation of streptomycin by a strain of *Streptomyces griseus*, and the formation of polymyxin by a strain of *Bacillus polymyxa*. These and like antibiotic substances have been demonstrated to be effective against various types of bacteria but to have little or no effect on fungi.

With the remarkable successes in the use of antibiotics in the control of diseases of animals, there has been an increase in interest in the use of such materials against plant diseases. A number of antibiotics have been tried in seed treatments, in inducing artificial resistance to diseases, or in chemotherapy with varying results. Rudolph, B. A., "Attempts to Control Bacterial Blights of Pear and Walnut With Penicillin," Phytopath. 36, 717–725 (1946); Ark, Peter A., "Effect of Crystalline Streptomycin on Phytopathogenic Bacteria and Fungi" (Abstr.), Phytopath. 37, 842 (1947).

The principal object of the present invention is to provide a new and useful antibiotic effective against fungi, and a process of preparing the same.

Another object of the present invention is to provide a fungicide adaptable for use in the control of plant diseases, or otherwise combatting microorganisms.

Other objects of the present invention will be apparent as the detailed description proceeds.

We have discovered that upon the cultivation of an actinomycete, and specifically a species in the genus Streptomyces, in a suitable nutrient medium a new antibiotic substance or substances are formed which may be recovered from the resulting culture broth or "beer." The new antibiotic, i. e. the active material in the culture, has been termed antimycin. It is unusual in that while it has little or no effect on bacteria including those commonly used in penicillin and streptomycin assays, it has been demonstrated to be highly effective against a large number of fungi that incite important diseases in plants. The chemical and physical properties of antimycin and its effects on a wide range of microorganisms differentiate it from previously described antibiotics.

*Microscopic characteristics.*—When grown on a variety of media, the organism that produces antimycin forms a dense vegetative mycelium from which abundant white to cream-colored, aerial hyphae grow. These are 0.8 to 1.2 $\mu$ in diameter, branched, and eventually segment into chains of spores, a characteristic that places the organism in the genus Streptomyces Waksman and Henrici of the order Actinomycetales Buchanan, Breed, Robert S., E. G. D. Murray, and A. Parker Hitchens. Bergey's Manual of Determinative Bacteriology. 6th ed. Williams and Wilkins and Company. Baltimore. 1948. The spores are oval, hyaline, and 0.7 to 1.2 $\mu$ by 0.8 to 1.2 $\mu$ in size. A picture of typical spore chains has been published Leben, Curt, and G. W. Keitt. An antibiotic substance active against certain phytopathogens. Phytopath. 38; 899–906. 1948; no chain has ever been observed to be spiral, a common characteristic of a number of organisms in this genus. The time at which the aerial hyphae segment into spores appears to be governed by several factors, including kind and volume of the medium, temperature, density of seeding, and moisture in the air.

A culture of the antimycin-producing Streptomyces of the present invention has been submitted to the United States Department of Agriculture, Agricultural Research Administration, Bureau of Agricultural and Industrial Chemistry, located at Peoria, Illinois. The culture has been deposited in the permanent collection of microorganisms as NRRL 2288 by the Culture Collection Section, Fermentation Division of the Northern Regional Research Laboratory. The term "antimycin-producing" Streptomyces or strain of Streptomyces employed herein refers to the organism identified as NRRL 2288.

The antimycin-producing Streptomyces of the present invention may be cultivated in accordance with standard procedures employed in the antibiotic field including the surface and shake flask culture procedures. In commercial operations, however, it is preferred to cultivate the antimycin-producing Streptomyces by the deep vat or tank procedure employing agitation and aeration as carried out in submerged industrial fermentations. The antimycin-producing Streptomyces may be cultivated in various types of nutrient mediums including a corn steep medium made up of about 50 grams of corn steep liquor (50% solids), 10 grams of glucose, and 1.5 grams of calcium carbonate per liter. In commercial operations it is preferred to cultivate the antimycin-producing Streptomyces in an aqueous soy bean medium containing about 40 grams of soy bean oil meal, 20 grams of glucose or like carbohydrate, and 1.5 grams of powdered calcium carbonate per liter. Investigations in this connection have demonstrated the use of the soy bean medium with the antimycin-producing Streptomyces of the present invention, to result in the production of particularly high yields of the desired antimycin which under optimum conditions may run as high as 80 times that obtainable by the use of the corn steep medium. Investigations have also demonstrated the increase in potency obtainable by the use of the soy bean medium to be associated with increased purity. In a representative test, for example, after two steps of the same fractionation procedure, the product obtained from the soy bean culture broth contained about double the antimycin units per mg. as the product obtained from the corn steep culture broth.

The cultivation or fermentation of the antimycin-producing Streptomyces may be carried out around room temperature, with a warm room temperature of about 24–29° C. being preferred. The optimum fermentation period may vary with different temperatures, nutrient mediums, etc., although experience has demonstrated the maximum concentration of antimycin to be reached in three or four days, e. g. in about 70 to 100 hours. The pH of the culture medium at the start should be at about the neutral point and proper adjustment, by addition of dilute acid or alkali as required, may be made at the time of inoculation to provide the desired pH of 7.0. As the antimycin-producing Streptomyces grows, the pH rises and at the end of the fermentation period should be about 7.5–8.5.

The culture "beer" remaining after the growth of the antimycin-producing organism contains unwanted, insoluble matter including some of the nutrient ingredients, mycelium, etc., and this inactive material is removed by filtering or centrifuging after adjusting the beer to pH 8–10. The filtrate or supernatant obtained contains the active material and is termed "crude antimycin liquor." It may contain as low as 3–5 units of antimycin per ml. or as high as 300–400 units of antimycin per ml. depending upon the cultivation employed. The antimycin may be recovered from the crude antimycin liquor by extraction with butanol or like water immiscible solvents. In the preferred process, however, the antimycin is precipitated from the crude liquor by addition of sufficient inorganic acid (HCl, $H_2SO_4$ or the like) to provide a pH of below 5 and preferably within the range of 2–4, e. g. a pH of about 2.5. This product is termed "crude acid precipitated antimycin." The antimycin may be recovered from the acid precipitate in solution form by extraction with ethanol, or other organic solvent such as methanol, acetone, ether, butanol, chloroform, ethylene glycol, propylene glycol, methyl acetate or pyridine. The resulting composition is termed "crude solvent antimycin," and when the preferred solvent ethanol is used "crude ethanol antimycin." As antimycin is not, or very slightly, soluble in water, crude suspensions of antimycin may be readily obtained by the addition of water to the crude ethanol antimycin or by the removal of ethanol at reduced pressure over water.

All of the crude antimycin compositions contain the product antimycin-A, an optically active, nitrogenous phenol which investigations show has the probable formula $C_{28}H_{40}O_9N_2$. It may be isolated in crystalline form from the crude antimycin liquor or other partially purified antimycin compositions by means of solvent fractionation procedures, the active material being taken successively into ethanol, ether and petroleum ether as described in detail below. It has been termed antimycin-A, as available evidence indicates that additional antibiotic factors are present in the crude antimycin preparations. Crude ethanol antimycin, for example, has been found to be more potent, weight for weight, than the crystalline antimycin-A when tested against *Colletotrichum circinans* and *Stemphylium sacinaeforme*. Antimycin-A, however, is itself an extremely potent fungicide producing inhibitory effects against *Nigrospora sphaerica* at dilutions as high as 1:800,000,000.

The following representative example will serve for illustrative purposes.

*Example*

To produce inoculum for large scale fermentations, a dried soil culture of the antimycin-producing Streptomyces species is first transferred into 30 ml. of a sterile aqueous soy bean medium containing 40 grams of soy bean oil meal, 20 grams of glucose and 1.5 grams of powdered calcium carbonate per liter. This culture is shaken at about 26° C. on a reciprocating shaker (e. g. with a 6" stroke at 66 cycles per minute) for about 48 hours. The resulting culture is next distributed among four two liter Erlenmeyer flasks, each containing 500 ml. of the same soy bean medium, and the cultures shaken again under the same conditions for about an additional 48 hours.

The inoculating cultures produced above are added to 70 liters of a previously sterilized aqueous soy bean medium containing about 2800 grams of soy bean oil meal, 1400 grams of glucose and 105 grams of powdered calcium carbonate. Fermentation is allowed to continue at 24–28° C. for about 80–96 hours with continuous stirring and with aeration at the rate of about 50–100 cubic feet of sterile air per minute. The fermentation tank which may be of the ordinary iron variety frequently used in carrying out fermentations, is preferably kept under air pressure of about 10–15 p. s. i. Small amounts of sterile soy bean oil (with or without other antifoaming agents) may be added to control the formation of foam during fermentation. The pH at inoculation is about 7 and at the end of the fermentation period about 7.6–7.8. Aseptic technique should be used throughout the culture methods.

The culture broth produced as above is adjusted to pH 8–10 with aqueous sodium hydroxide, centrifuged or filtered to remove insoluble materials and the sediment discarded. The supernatant or filtrate (crude antimycin liquor) is next acidified with concentrated hydrochloric acid to pH 2.5, the resulting suspension centrifuged or filtered and the inactive supernatant or filtrate discarded. The antimycin is then recovered in solution form by extracting the solid material (crude acid precipitated antimycin) five times with six liter portions of ethanol. The resulting composition, crude ethanol antimycin, is stable and loses no activity when stored at 8° C. for over a year. It may be used in this form, although for application to plants crude ethanol antimycin may be diluted with water to provide a 25 per cent ethanol solution. Aqueous suspensions of crude amorphous antimycin are readily prepared by removing the ethanol at reduced pressure over water or by adding four or more volumes of water to the ethanol solution.

In aqueous alkaline solutions crude antimycin is inactivated at room temperature in two days at pH 9.3 and in one hour at pH 11.0. The active material in crude antimycin liquor (pH 8.3) is nondialyzable but is heat labile as it is inactivated in eight minutes at 100° C. About one half of the activity of crude ethanol antimycin is also lost on refluxing for 1.5 hours.

*Isolation of antimycin-A.*—A 60 liter, 96 hour culture employing the soy bean medium described above and containing about 400 units per ml., is adjusted to pH 9.0 with saturated aqueous sodium hydroxide solution, mixed with about 3600 grams of a diatomaceous earth filter aid such as the product sold under the name "Celite 503," passed through a filter press and the resulting filter cake discarded. The cloudy filtrate obtained is brought to pH 2.5 by addition of concentrated hydrochloric acid, mixed with about 1300 grams of Celite 503 and again filtered. This latter filter cake which contains the active material, is washed by pumping through the press about 10 liters of acidulated water containing sufficient hydrochloric acid to provide the wash water with a pH of 2.5. The washed filter cake is then extracted with five 6 liter portions of 95% ethanol, each portion of alcohol being recycled through the press for about fifteen minutes.

The ethanol extract produced as above and containing about 500 units per ml. is concentrated in vacuo at 30-40° C. to about two liters. The aqueous suspension obtained is thoroughly extracted by shaking out seven times with equal volumes of ether. The stable ether-water emulsions produced by this operation are broken by centrifuging, the ether layer separated and the ether removed by evaporation. The residue obtained is a dark colored oily paste containing about 325 units per mg.

The oily paste residue is dissolved in about 200 ml. of absolute ether, a small amount of inactive, insoluble solid filtered off, the ether removed and the residue stirred with 100 ml. of petroleum ether such as the product sold under the name "Skellysolve A" with a boiling point of 30-40° C. The petroleum ether with dissolved oily liquid present in the original paste is then separated, leaving as the residue an insoluble dark colored solid.

The dark colored solid is placed in the thimble of a Soxhlet extraction apparatus, and exhaustedly extracted with petroleum ether for about six days. The light colored solid material which accumulates in the extraction flask, is collected at one or two day intervals, and contains about 384 units per mg. The light colored solid material obtained during the petroleum ether extraction operation is dissolved in the minimum amount of boiling ether, petroleum ether added to incipient turbidity, and the solution allowed to stand, first at room temperature and then at 4° C. for several days. The crystals formed in the ether-petroleum ether medium are collected with suction, washed with petroleum ether and dried. The crystalline material obtained (crude antimycin-A), contains about 900–1300 units per mg. and is a light tan product melting at 126–128° C. Repeated crystallizations of this product from methanol, aqueous methanol, isopropyl ether, or isopropyl ether-petroleum ether mixtures yields a product with a constant melting point of 139–140° C. and with a specific rotation in chloroform of $(\alpha)_D^{25} + 64.8°$. For analysis the material is dried to constant weight over $P_2O_5$ at 60° C. and 0.2 mm. pressure. Anal. calcd. for $C_{28}H_{40}O_9N_2$: C, 61.30; H, 7.35; N, 5.11. Found: C, 61.11, 61.09; H, 7.26, 7.47; N, 5.24, 5.24; alkoxyl, nil.

The purified antimycin-A is colorless but shows two bands in the ultraviolet with maxima at 245 and 347 mµ, and molecular extinctions of 38,000 and 9,600 respectively. It has been demonstrated to be a nitrogenous phenol and gives strong positive Millon's, ferric chloride, and Gibb's phenol tests, but negative Molisch, ninhydrin, Erlich, fuchsin aldehyde, and 2,4-dinitrophenylhydrazine tests, and no color with cold concentrated sulfuric acid. Antimycin-A is freely soluble in such moderately polar organic solvents as ethanol, acetone, and chloroform, but very slightly soluble in typically non-polar solvents such as petroleum ether, benzene, and carbon tetrachloride. It is insoluble in water and in 5 per cent solutions of hydrochloric acid, sodium carbonate and sodium bicarbonate. In aqueous sodium hydroxide, the crystals disintegrate and form a milky suspension which clears on warming. Active antimycin-A cannot be recovered from such solutions.

The nitrogenous phenol compounds (antimycin-A) exhibits characteristic absorption bands in the infra red region of the spectrum when dissolved in carbon tetrachloride (using a #.2 mm. cell with 2 cc. solution containing 30 mg. nitrogenous phenol compound) at the following frequencies expressed in reciprocal centimeters: 3400, 2900, 1750, 1700, 1640, 1530, 1430, 1360, 1270, 1250, 1220, 1185–1170, 1160–1140, 1070, 1020, and 945. The strongest bands are at 1750 and 1530 while the bands at 1185–1170 and 1160–1140 are relatively strong broad bands.

The infra-red spectrum with the above absorption bands for antimycin-A is shown in the accompanying drawing.

Alcoholic solutions of antimycin-A appear to be stable indefinitely under ordinary laboratory conditions. No particular sensitivity to light or to atmospheric oxygen has been noted. The substance has no basic properties but is weakly acidic, probably because of the presence of the phenol function in the molecule.

*Assay method.*—A method for assaying antimycin preparations by a plate assay using the fungus *Glomerella cingulata* is described in the publication Leben, C., and Keitt, G. W., "An Antibiotic Substance Active Against Certain Phytopathogens," Phytopath. 38, 899–906 (1948). An ethanol solution of the active material (crude ethanol antimycin) giving zones of inhibition from 16 to 18 mm. has been arbitrarily assigned a potency of 1 unit per ml. and used as a standard. In the assay method now preferred the Leben and Keitt procedure in Phytopath., supra, has been modified by substituting peptone agar (5 grams of peptone with 17 grams of agar) for the nutrient agar, and by using a specified number of spores (ca. 100,000) per plate. The standard solution is made up in concentrations of 0.5, 1, 2, 4 and 8 units per ml. Samples to be assayed are dissolved in alcohol and diluted to give four solutions, each one half as concentrated as the preceding, and estimated to fall in the range of 0.5–8 units per ml. The alcohol alone causes no inhibition.

In carrying out an assay each petri plate receives one disc for each concentration of the sample or standard, that is, either four or five discs per plate and all plates are set up in triplicate. After 40–48 hours incubation at 28° C., the inhibition zones are measured with a mm. scale and the diameters averaged for each dosage level. Curves are plotted with the log of the concentration (relative concentrations in the case of unknowns) and the diameter of the inhibition zone as coordinates. Straight line functions nearly always result and most of the sample curves are parallel to the standard. From the curve of each sample the concentration that gives the same size inhibition zone as the standard containing one unit per ml. is next determined. This concentration of the unknown is then regarded as containing one unit of antimycin activity per ml. This assay procedure has been found to be entirely satisfactory for use in determining the potencies of antimycin preparations.

Antimycin has been found to inhibit the growth of all types of fungi tested. These include the following species: *Alternaria solani* (E. and M.) Jones and Grout, *Ascochyta* sp. (from pea), *Chalara quercina* Henry, *Cochliobolus* (*Ophiobolus*) *miyabeanus* Ito and Kuribay, *Colletotrichum circinans* (Berk.) Vogl., *C. graminicolum* (Ces.) G. W. Wils., *C. lagenarium* (Pass.) E. and H., *C. lindemuthianum* (S. and M.) Bri. and Cav., *C. pisi* Pat., *C. phomoides* (Sacc.) Chester, *Fusarium oxysporum* f. *conglutinans* (Wr.) S. and H., *F. oxysporum* f. *lycopersici* (Sacc.) S. and H., *F. oxysporum* f. *nicotianae* (Johns.) S. and H., *F. oxysporum* f. *pisi* (Sny.) S. and H., *Gibberella zeae* (Schw.) Petch, *Glomerella cingulata*, *Helminthosporium sativum* Pam., King, and Bakke, *Macrosporium* sp. (from muskmelon), *M.* sp. (from pea), *Mycosphaerella citrullina* (Sm.) Gross., *Neurospora crassa* Shear and Dodge, *Nigrospora sphaerica* (Sacc.) Mason, *Phoma lingam* (Tode) Desm., *P. terrestris* Hansen, *Phycomyces blakesleeanus* Burgeff, *Pythium graminicolum* Subr., *P.* sp., *Schlerotinia fructicola, S. laxa* Ader. and Ruhl., *S. minor* Jagger, *S. sclerotiorum* (Lib.) De Bary, *Stemphylium sarcinaeforme* (Cav.) Wilts., and *Venturia inaequalis*.

Antimycin has also been tested with bacteria including the following species: *Agrobacterium tumefaciens* (Smith and Townsend) Conn, *Bacillus cereus* var. *mycoides* (Flugge) Bergey et al., *B. subtilis* Cohn emend Prazmowski, *Corynebacterium fascians* (Tilford) Dowson, *Erwinia amylovora* (Burrill) Winslow et al., *Escherichia coli* H 52 (Migula) Castellani and Chalmers, *Micrococcus pyogenes* var. *aureus* 209 P. (Rosenbach) Zopf, *Proteus vulgaris* Hauser, *Pseudomonas aeruginosa* (Schroeter) Migula, *P. savastanoi* (Erw. Smith) Stevens, *P. solanacearum* Erw. Smith, *Serratia marcescens* Bizio, *Xanthomonas beticola* (Smith, Brown, and Townsend) Bergey et al., and *X. campestris* (Pammel) Dowson. The only bacterial species tested above that were affected by antimycin were *B. cereus* var. *mycoides* and *E. amylovora*, which were completely inhibited at a distance of 12 and 17 mm., respectively, from a culture of the antimycin-producing Streptomyces.

The end point, i. e. point at which the growth of the organism is completely inhibited by antimycin, may vary with different testing conditions, as well as with different isolates of the particular organism being tested. Tests using the standard agar streak (solid basis) test method (Leben and Keitt, supra) have shown crude ethanol antimycin solutions containing about 55 units per ml. to completely inhibit *Venturia inaequalis* at dilutions of 1:8,000,000 and *Sclerotinia fructicola* at dilutions of 1:11,000,000. With a crude ethanol antimycin solution containing about 15 units per ml., the smallest amount of antimycin (dry weight) that completely inhibits the growth of other organisms is shown below in Table I.

TABLE I

| Organism | Inhibition Point μg. per ml. |
|---|---|
| Ascochyta sp. (from pea) | 25.0 |
| Bacillus cereus var. mycoides | 125.0 |
| Chalara quercina | 0.8 |
| Colletotrichum circinans | 1.6 |
| Colletotrichum lindemuthianum | 12.5 |
| Colletotrichum phomoides | 0.8 |
| Colletotrichum pisi | 1.6 |
| Glomerella cingulata | 0.8 |
| Nigrospora sphaerica | 0.2 |
| Phoma lingam | 0.4 |
| Stemphylium sarcinaeforme | 1.6 |

Tests have demonstrated antimycin to have fungicidal as well as fungistatic properties. Tests have also demonstrated that the fungicidal activity of antimycin may be increased (i. e. the time required to kill the organism decreased) in the case of certain fungi by the use of surface active wetting or penetrating agents such as the alkali metal alkyl benzene sulfonates such as the sodium alkyl benzene sulfonate product sold under the name "Intraderm." The results of representative tests using 100 units of antimycin are set forth below in Table II.

TABLE II

| Fungus | Killing Time | |
|---|---|---|
|  | Antimycin | Antimycin and 10% Intraderm |
|  | Hours | Hours |
| Trichophyton mentagrophytes | 6 | 4 |
| Microsporum audouini 142 | 6 | 2 |
| Trichophyton tonsurans | 4 | 1 |
| Epidermophyton inguinale | 1 | 1 |
| Trichophyton schoenleini | 1 | 1 |
| Microsporum audouini 167 | 1 | 1 |
| Trichophyton rubrum | 1 | 1 |
| Microsporum fulvum | 1 | 1 |

The tests were made after 1, 2, 4 and 6 hours. It will be noted that the use of Intraderm reduced the killing time of the first three organisms tested, but had no apparent effect on the killing time of the last five organisms tested under the conditions of this test.

Antimycin used in the form of a protectant plant spray has been demonstrated to be effective against apple scab and tomato early blight. No phytotoxic effects have been noted with either crude antimycin or crystalline antimycin-A. When used as a protectant fungicide to combat or control plant diseases, the use of crude antimycin liquor, crude ethanol antimycin solutions containing 25 per cent or less of ethanol, and aqueous suspensions of crude antimycin are generally preferred. Ethanol antimycin containing over 25 per cent ethanol should not be applied to plants, as preparations containing higher percentages of ethanol or like organic solvent tend to deleteriously affect the foliage of some plants. Crude antimycin preparations when applied to plant leaves, etc., have also been demonstrated to be resistant to removal by rain. As purified crystalline antimycin-A has been found to be relatively readily washed off, tenacity, i. e. ability of the active material to stick on plants, is apparently associated with some ingredient or combination of ingredients (possibly impurities) in the crude antimycin preparations.

The antimycin preparations when employed in the plant field may be used alone or in combination with various insecticides. Tests, for example, have shown antimycin to be compatible with DDT, benzene hexachloride, hexaethyltetraphosphate, nicotine sulfate and lead arsenate. The use of combinations of this type provides a composition having both fungicidal and insecticidal action.

We claim:

1. A process for the production of antimycin comprising cultivating a culture medium inoculated with an antimycin-producing strain NRRL 2288 of Streptomyces for about 70-100 hours at a temperature of about 24-29° C., separating the culture broth from unwanted insoluble material including organism growth, acidifying the resulting crude antimycin liquor, and recovering the resulting crude acid precipitated antimycin precipitate.

2. A process for the production of antimycin comprising cultivating a culture medium inoculated with an antimycin-producing strain NRRL 2288 of Streptomyces for about 70-100 hours at a temperature of about 24-29° C., separating the culture broth from unwanted insoluble material including organism growth, acidifying the resulting crude antimycin liquor, separating the resulting crude acid precipitated antimycin precipitate from the inactive liquid, and recovering the antimycin in solution form by extracting the acid precipitated antimycin with an inert, organic antimycin solvent.

3. A process for the production of antimycin which comprises the submerged aerobic cultivation of a soy bean culture medium inoculated with an antimycin-producing strain NRRL 2288 of Streptomyces for about 3-4 days at a temperature of about 24-29° C., separating the culture broth from unwanted insoluble material including organism growth, acidifying the resulting crude antimycin liquor, and recovering the resulting crude acid precipitated antimycin precipitate.

4. A process for the production of antimycin which comprises the submerged aerobic cultivation of a soy bean culture medium inoculated with an antimycin-producing strain NRRL 2288 of Streptomyces for about 3-4 days at a temperature of about 24-29° C., separating the culture broth from unwanted insoluble material including organism growth, acidifying the resulting crude antimycin liquor, separating the resulting crude acid precipitated antimycin precipitate from the inactive liquid, and recovering the antimycin in solution form by extracting the acid precipitated antimycin with ethanol.

5. A process for the production of antimycin comprising cultivating an aqueous soy bean oil meal-glucose culture medium inoculated with an antimycin-producing strain NRRL 2288 of Streptomyces for about 3-4 days at 24-29° C., separating the culture broth from the organism growth, acidifying the resulting crude antimycin liquor with hydrochloric acid to a pH of about 2.5, and separating the resulting crude acid precipitated antimycin precipitate from the inactive liquid.

6. A process for the production of antimycin which comprises the submerged aerobic cultivation of a neutral aqueous soy bean oil-glucose culture medium inoculated with an antimycin-producing strain NRRL 2288 of Streptomyces for about 80-96 hours at 24-29° C., separating the resulting slightly alkaline culture broth from the organism growth, acidifying the resulting crude antimycin liquor with concentrated hydrochloric acid to a pH of about 2.5, separating the resulting crude acid precipitated antimycin precipitate from the inactive liquid and recovering the antimycin as crude ethanol antimycin by extracting the acid precipitated antimycin with ethanol.

7. A process for the production of antimycin comprising cultivating a culture medium inoculated with an antimycin-producing strain NRRL 2288 of Streptomyces, separating the culture broth from unwanted insoluble material including organism growth, acidifying the resulting crude antimycin liquor, separating the resulting crude acid precipitated antimycin precipitate from the inactive liquid, extracting the acid precipitated antimycin with ethanol, and forming aqueous suspensions of antimycin by mixing at least about four volumes of water with each volume of ethanol extract.

8. The fungistatic and fungicidal composition resulting from the growth of the antimycin-producing strain NRRL 2288 of Streptomyces, the active ingredients in said composition being heat labile, non-dialyzable and unstable in aqueous alkaline solution at pH 9.3 and above; said composition being characterized by the presence of a weakly acidic optically active nitrogenous phenol compound which gives strong positive Millon's, ferric chloride and Gibb's phenol tests, and negative Molisch, ninhydrin, Erlich, fuchsin aldehyde, and 2,4-dinitrophenylhydrazine tests, and no color with cold concentrated sulfuric acid; said nitrogenous phenol compound also being characterized by its solubility in polar organic solvents including ethanol, acetone and chloroform, its slight solubility in typically non-polar solvents including petroleum ether, benzene, and carbon tetrachloride, and its substantial insolubility in water and in 5 per cent solutions of hydrochloric acid, sodium carbonate and sodium bicarbonate; said nitrogenous phenol compound being further characterized by a melting point of about 139-140° C., a specific rotation in chloroform of $(a)_D^{25}+64.8°$ and by two bands in the ultraviolet with maxima at 245 and 347, said nitrogenous phenol compound exhibiting characteristic absorption bands in the infra red region of the spectrum when dissolved in carbon tetrachloride at the following frequencies expressed in reciprocal centimeters: 3400, 2900, 1750, 1700, 1640, 1530, 1430, 1360, 1270, 1250, 1220, 1185-1170, 1160-1140, 1070, 1020, and 945.

GEORGE W. KEITT.
CURT LEBEN.
FRANK M. STRONG.

References Cited in the file of this patent

UNITED STATES PATENTS

| Number | Name | Date |
|---|---|---|
| 2,461,922 | Rake | Feb. 15, 1949 |

OTHER REFERENCES

Leben and Keitt, Phytopath., 38, pages 899 to 906, November 1948.

Ford on Actidione in Journal American Chemical Society, volume 69, page 474 (1947).

Ford, Journal American Chemical Society, volume 70, pages 1223 to 1225 (1948).

Gause, Science, September 27, 1946, pages 289 to 290.

Whiffin, Journal Bact. 56, 3, September 1948, pages 283, 290.

Science News Letter, November 1948, page 342.

Annual Review of Microbiology 1948, volume II, "Antibiotics" by Bailey, page 143.